US010864674B2

(12) United States Patent
Adair et al.

(10) Patent No.: US 10,864,674 B2
(45) Date of Patent: *Dec. 15, 2020

(54) MATERIAL PROCESSING UNIT CONTROLLED BY ROTATION

(71) Applicant: HURCO COMPANIES, INC., Indianapolis, IN (US)

(72) Inventors: David C. Adair, Indianapolis, IN (US); Michael Doar, Rockford, IL (US); Frederick W. Gross, Carmel, IN (US); Elias G. Pavlakos, Carmel, IN (US); Gregory S. Volovic, Carmel, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 220 days.

This patent is subject to a terminal disclaimer.

(21) Appl. No.: 15/829,385

(22) Filed: Dec. 1, 2017

(65) Prior Publication Data

US 2018/0081343 A1    Mar. 22, 2018

Related U.S. Application Data

(63) Continuation of application No. 14/278,920, filed on May 15, 2014, now Pat. No. 9,964,944.

(51) Int. Cl.
*B29C 64/118* (2017.01)
*G05B 19/414* (2006.01)
(Continued)

(52) U.S. Cl.
CPC .......... *B29C 64/118* (2017.08); *B29C 64/209* (2017.08); *G05B 19/4145* (2013.01);
(Continued)

(58) Field of Classification Search
None
See application file for complete search history.

(56) References Cited

U.S. PATENT DOCUMENTS 5,914,881 A    6/1999  Trachier
6,022,207 A    2/2000  Dahlin et al.
(Continued)

FOREIGN PATENT DOCUMENTS

CN    102323432    1/2012
DE      4422146    1/1996
WO    2014013247   1/2014

OTHER PUBLICATIONS

2BEIGH3 Combination CNC Machine and 3D Printer, instructables, Sep. 12, 2012, pp. 1-51.
(Continued)

*Primary Examiner* — Charles E Anya
(74) *Attorney, Agent, or Firm* — Faegre Drinker Biddle & Reath LLP

(57) ABSTRACT

An interchangeable unit adapted to couple to a computer numerical control ("CNC") machine is disclosed comprising a holder that couples to a spindle of the CNC machine, a controller, wherein said controller is configured to receive the rotational speed of the spindle as an input, and a material processing unit, wherein said material processing unit executes a first function in response to a first rotational speed range of the spindle and executes a second function in response to a second rotational speed range of the spindle.

29 Claims, 13 Drawing Sheets

(51) Int. Cl.
| | |
|---|---|
| *B29C 64/209* | (2017.01) |
| *B29C 48/02* | (2019.01) |
| *B29C 48/05* | (2019.01) |
| *B29C 48/25* | (2019.01) |
| *B29C 48/80* | (2019.01) |
| *B29C 48/285* | (2019.01) |

(52) U.S. Cl.
CPC .. *B23Q 2220/008* (2013.01); *B23Q 2230/002* (2013.01); *B29C 48/02* (2019.02); *B29C 48/05* (2019.02); *B29C 48/252* (2019.02); *B29C 48/256* (2019.02); *B29C 48/266* (2019.02); *B29C 48/269* (2019.02); *B29C 48/2692* (2019.02); *B29C 48/2888* (2019.02); *B29C 48/802* (2019.02); *B29C 2948/9259* (2019.02); *B29C 2948/92885* (2019.02); *B29C 2948/92952* (2019.02); *G05B 2219/49077* (2013.01)

(56) References Cited

U.S. PATENT DOCUMENTS

| | | | |
|---|---|---|---|
| 6,119,497 | A | 9/2000 | Eisele |
| 6,666,630 | B2 | 12/2003 | Zimmermann et al. |
| 7,291,002 | B2 | 11/2007 | Russell et al. |
| 7,744,801 | B2 | 6/2010 | Owada |
| 8,406,508 | B2 | 3/2013 | Pollack et al. |
| 8,556,373 | B2 | 10/2013 | Buestgens et al. |
| 8,604,381 | B1 | 12/2013 | Shin |
| 9,964,944 | B2 | 5/2018 | Adair et al. |
| 2008/0100251 | A1 | 5/2008 | Xu |
| 2009/0234490 | A1 | 9/2009 | Suprock et al. |
| 2010/0161105 | A1 | 6/2010 | Blake |
| 2010/0171275 | A1 | 7/2010 | Nguyen |
| 2013/0287933 | A1 | 10/2013 | Kaiser et al. |
| 2013/0295338 | A1 | 11/2013 | Keating et al. |
| 2014/0054817 | A1 | 2/2014 | Jaffe |
| 2014/0117585 | A1* | 5/2014 | Douglas ............. B33Y 30/00 264/401 |
| 2014/0154347 | A1* | 6/2014 | Dilworth ............ B29C 64/106 425/87 |
| 2014/0159273 | A1* | 6/2014 | Koop ................. B65H 51/10 264/129 |
| 2014/0271964 | A1 | 9/2014 | Roberts, IV et al. |
| 2015/0005919 | A1 | 1/2015 | McGatha et al. |
| 2015/0140145 | A1 | 5/2015 | Schmehl et al. |
| 2015/0145177 | A1 | 5/2015 | Ei-Siblani et al. |
| 2015/0165690 | A1 | 6/2015 | Tow |
| 2015/0209925 | A1 | 7/2015 | Dodds |
| 2015/0335451 | A1 | 11/2015 | Liu et al. |
| 2015/0360317 | A1 | 12/2015 | Kalvala et al. |

OTHER PUBLICATIONS

Holloway, J., License to mill: Mebotics' Microfactory combines 3D printer and milling machine, gizmag electronics, Sep. 13, 2013, pp. 1-6.

Optomec to Lauch LENS Print Engine for 3D Printed Metals at Additive Manufacturing Conference, Fort Mill Times, Mar. 11, 2014, pp. 1-2.

Hewitt, J., This awesome 'replicator' combines industrial machining with laser 3D printing to create just about anything, extremetech electronics, Jan. 23, 2014, pp. 1-5.

International Search Report and Written Opinion issued by the European Patent Office, dated Oct. 2, 2015, for International Application No. PCT/US2015/031076; 7pages.

International Preliminary Report on Patentability issued by The International Bureau of WIPO, dated Nov. 15, 2016 for International Application No. PCT/US2015/031076; 6 pages.

Examination report issued by the German Patent and Trademark office, dated Aug. 10, 2017, for related Application No. DE112015001860.3; 6 pages.

Carsten, "Conversion CNC Milling Machine to 3D Printer? (Temporary)", available on the Internet as of Nov. 27, 2017 at https://www.mikrocontroller.net/topic/315745, German language; 5 pages.

Carsten, "Conversion CNC Milling Machine to 3D Printer? (Temporary)", available on the Internet as of Nov. 27, 2017 at https://translate.google.com/translate?hl=en&sl=de&u=https://www.mikrocontroller.net/topic/315745&prev=search, Google translation to English; 9 pages.

* cited by examiner

MATERIAL PROCESSING UNIT CONTROLLED BY ROTATION

CROSS-REFERENCE TO RELATED APPLICATIONS

This application is a continuation of and claims priority to U.S. patent application Ser. No. 14/278,920, entitled "MATERIAL PROCESSING UNIT CONTROLLED BY ROTATION," filed on May 15, 2014, the entire disclosure of which being expressly incorporated herein by reference.

FIELD OF THE DISCLOSURE

The present disclosure relates generally to a material processing unit adapted to be coupled to a spindle of a computer numerical control ("CNC") machine, wherein the material processing unit is controlled and/or powered, wholly or in part, by the rotation of the spindle. More particularly, the disclosure relates to the use of such a material processing unit including an extruder in a system and in a method of additive and subtractive manufacture.

BACKGROUND AND SUMMARY

CNC machines are widely used in industry for manufacturing components or parts. CNC machines are advantageous because they utilize computer-aided design ("CAD") and computer-aided manufacturing ("CAM") programs to manufacture components to exact specifications in continuous, automated processes. The production of a component from a blank or a raw material might require the use of different cutting tools such as milling tools, radius bits and drills. Therefore, CNC machines also allow for the interchangeability of tools during a continuous, automated manufacturing process for a part or component.

One use for CNC machines is subtractive manufacturing, or processes where parts of a blank or raw material are removed, for example, by milling, drilling, and grinding. For additive manufacturing, or the process of adding material in certain shapes to create a part or component, the use of three-dimensional ("3D") printing has increased in both industrial and consumer applications. 3D printing uses extruded materials, oftentimes plastics, for depositing material to create free-standing parts, or to add components to a pre-existing part. However, 3D printers are expensive and provide only small work volumes in which a part can be manufactured.

Thus, a self-contained material processing unit such as an extruder device that is interchangeable as a tool with a pre-existing CNC machine would be desirable. A CNC machine would provide a larger 3D work volume in which a part could be produced, and such an interchangeable extruder device would reduce the need to buy a separate 3D printing device. The additive manufacture enabled by an extruder device would complement the subtractive manufacture of a CNC machine. A user could access a CNC machine console as a CAD/CAM programming station to program a combined additive/subtractive, continuous, and automated manufacturing process for a component.

The present disclosure therefore provides an interchangeable unit adapted to couple to a computer numerical control ("CNC") machine comprising: a holder that couples to a spindle of the CNC machine; a controller, wherein said controller is configured to receive the rotational speed of the spindle as an input; and a material processing unit, wherein said material processing unit executes a first function in response to a first rotational speed range of the spindle and executes a second function in response to a second rotational speed range of the spindle.

The present disclosure also provides an extruder adapted to couple to a computer numerical control ("CNC") machine comprising: a holder that couples to a spindle of the CNC machine; and a generator supported by the holder that converts rotary motion of the spindle into power for the extruder, wherein the extruder provides extruded material to form a part in response to a speed of rotation of the spindle.

The present disclosure also provides a system for at least one of additive and subtractive manufacture of a part comprising: a computer numerical control ("CNC") machine, wherein said machine includes a spindle; an extruder, wherein the extruder provides extruded material to form a part in response to a speed of rotation of the spindle; a generator that converts rotary motion of the spindle into power for the extruder; and a filament source adapted to provide filament to the extruder for placement in a space to form the part.

The present disclosure further provides a method of additive and subtractive manufacture of a part comprising: providing a holder for coupling with a spindle of a computer numerical control ("CNC") machine, wherein said holder is further configured to couple with a material processing unit and a subtractive tool; depositing material within a space to form the part with the material processing unit in response to a speed of rotation of the spindle; and removing material from the part within the space with the subtractive tool.

The present disclosure further provides an extruder adapted to couple to a computer numerical control ("CNC") machine comprising: a microprocessor that controls the operating state of the extruder according to a rotation speed of a spindle of the CNC machine, wherein the extruder provides extruded material to form a part in response to a speed of rotation of the spindle.

BRIEF DESCRIPTION OF THE DRAWINGS

The above-mentioned aspects of the present teachings and the manner of obtaining them will become more apparent, and the teachings will be better understood by reference to the following description of the embodiments taken in conjunction with the accompanying drawings, wherein.

DETAILED DESCRIPTION OF THE DRAWINGS

The embodiments disclosed herein are not intended to be exhaustive or to limit the invention to the precise form disclosed in the following detailed description. Rather, the embodiments were chosen and described so that others skilled in the art may utilize their teachings.

Figure 1:
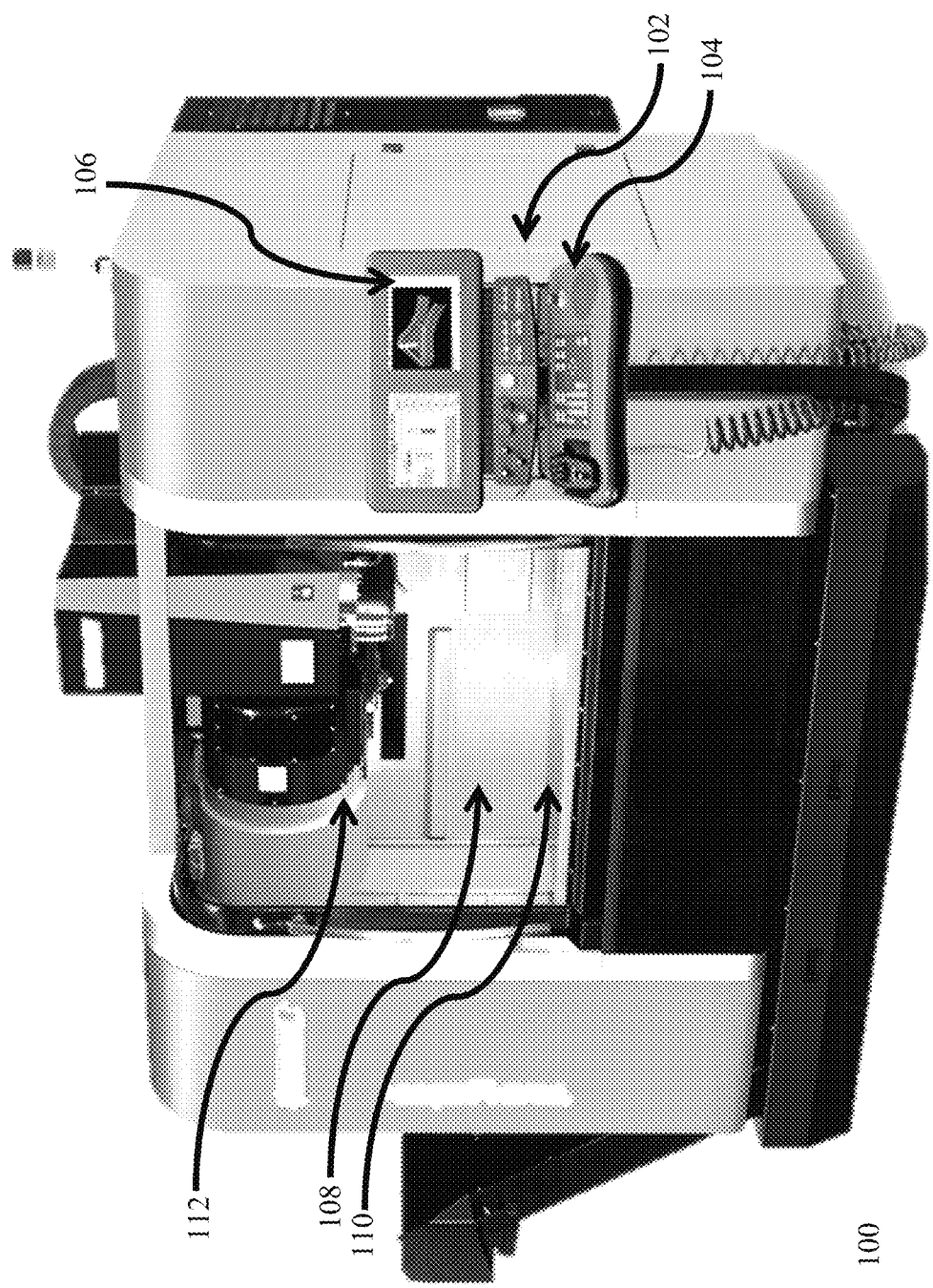
FIG. 1 is a front view of a CNC machine with a control console.

Referring first to FIG. 1, a front view of a CNC machine 100 is shown. CNC machine 100 includes a control console 102 with user controls 104 and a viewable screen 106. In one embodiment, controls 104 and viewable screen 106 allow a user to generate part programs using conventional methods including accessing computer-aided design ("CAD") and computer-aided manufacturing ("CAM") programs. CAD and CAM programs allow for manufacture of components to meet exact specifications in continuous, automated processes. These processes may include both additive and subtractive manufacturing. In the center of CNC machine 100, a workspace 108 and working parts 112 are shown.

Workspace 108 has a flat working surface 110, so that a user can mount a blank or raw material on working surface 110 to be worked upon by CNC machine 100. When CNC machine 100 is operational, workspace 108 is closed by a door or screen (not shown). In some embodiments, workspace 108 remains closed during a continuous, automated manufacturing program. The program can begin after a blank or raw material is mounted to working surface 110 and the door or screen is closed, and end after the program has created a part by controlling the operation of working parts 112 according to user input specifications. The continuous, automated manufacturing program of the present disclosure can be a subtractive manufacturing program, an additive manufacturing program, or a combination of both subtractive and additive manufacture. It should further be understood that working parts 112 include a spindle and a plurality of axes (linear and/or tilt) controlled by servo motors.

Subtractive manufacture includes, but is not limited to grinding, drilling, boring, shaving, milling, and cutting. Additive manufacture includes, but is not limited to, extruding, which oftentimes is carried out using moldable and flowable plastics. Other materials to be used in an additive manufacturing program might include rubber, metals, epoxies, glue, or composite materials. In some embodiments, a user does not mount any blank or raw material to working surface 110, and workspace 108 is closed, beginning an additive and subtractive manufacturing program. According to embodiments of the disclosure, the material for additive manufacture can be contained entirely within workspace 108 before, during, and after a manufacturing process. Additive and subtractive manufacture, in some embodiments, further includes heating, cooling, and/or curing material, optionally with lasers, UV lights, and/or fluid streams within workspace 108.

Still referring to FIG. 1, working parts 112 (described in more detail with reference to FIG. 2 below) of CNC machine 100 are programmed to move according to a user input to create a specific shape. As indicated above, working parts 112 include a spindle and spindle head (described in more detail below). During a continuous, automated manufacturing program, working parts 112 move within workspace 108 to create a part or component. In one embodiment, working parts 112 are coupled with cutting tools in a subtractive manufacturing program. In other embodiments, working parts 112 are coupled with an extruder during an additive manufacturing process. In one embodiment, during a continuous, automated manufacturing program using both additive and subtractive manufacturing to create a component, working parts 112 interchangeably couple with subtractive manufacturing tools, such as a milling tool, and additive manufacturing tools, such as an extruder.

The terms "couple" and "coupling" as used herein refer to any connection for machine parts known in the art including, but not limited to, connections with bolts, screws, threads, magnets, electro-magnets, adhesives, frictions grips, welds, snaps, clips, etc.

Figure 2:
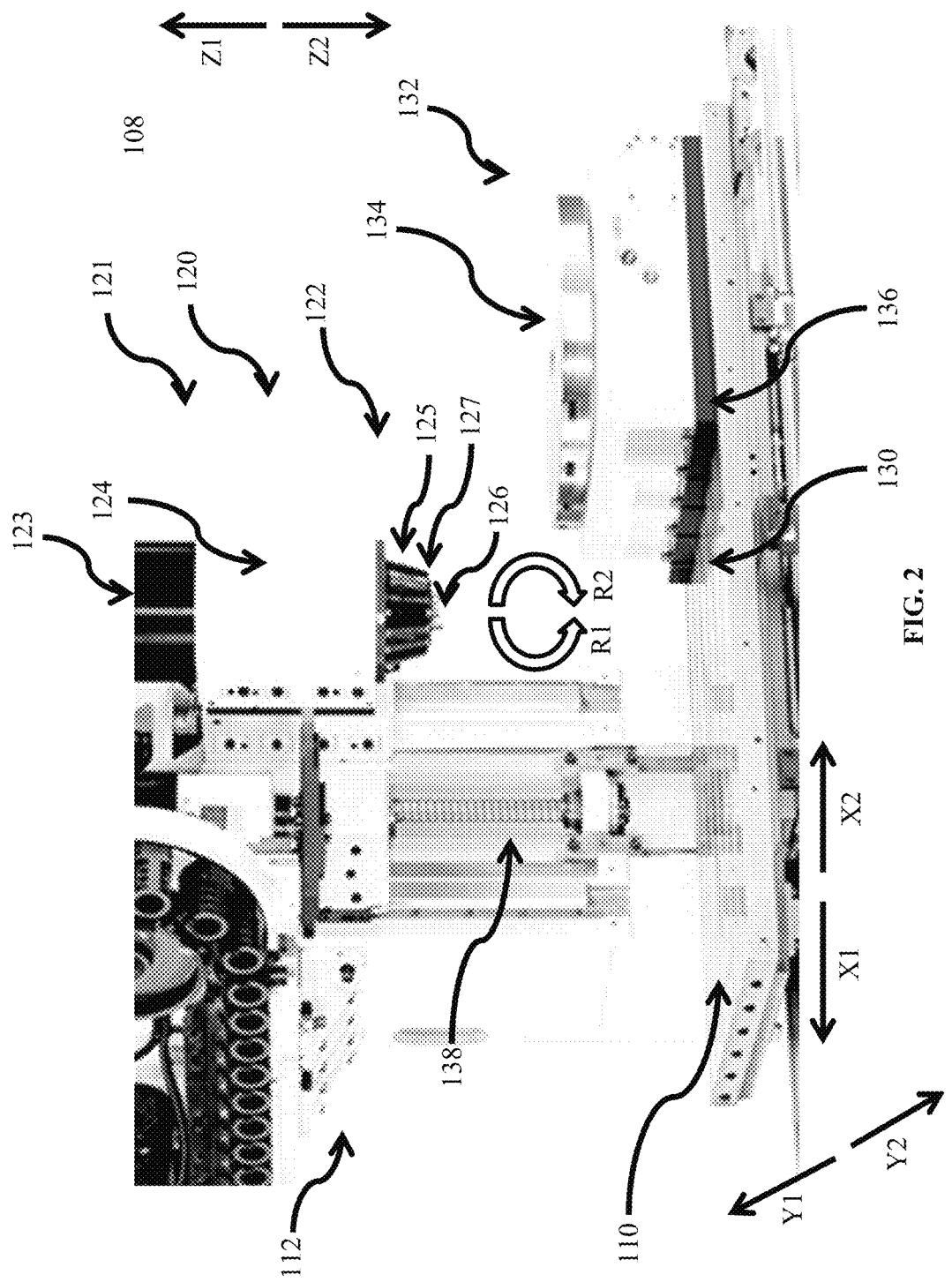
FIG. 2 is a perspective view of a workspace of the CNC machine with a spindle head.

Referring now to FIG. 2, a perspective view of workspace 108 in CNC machine 100 is shown. In the embodiment shown, workspace 108 is the workspace of a 5-axis CNC machine model, and the axes are described further below. Working parts 112 include a spindle head 120 with an upper portion 121 and a lower portion 122. Upper portion 121 includes a motor housing 123 and a head casting 124, between upper portion 121 and lower portion 122. Lower portion 122 includes a spindle 125 and coupling keys 126. Spindle 125 has a lower flat surface 127, and keys 126 extend downwardly below surface 127. In the embodiment shown, there are three coupling keys; however, more or less are contemplated. Any combination of a spindle and keys known in the art capable of coupling interchangeably with a holder, specifically a tool holder (described in more detail below) is envisioned. Spindle 125 and keys 126 are able to interchangeably couple with subtractive manufacturing tools, such as drills, and additive manufacturing tools such as extruders, or other material processing units described herein.

Still referring to FIG. 2, working surface 110 has grooves 130 and an optional working table 132. Grooves 130 facilitate affixing material to be machined, or affixing a fixture, such as working table 132, or other material holders to working surface 110. Working table 132 has a flat upper surface 134 and a groove-fitting lower surface 136. Upper surface 134 allows for a blank or piece of raw material to be mounted to working table 132 for either additive or subtractive manufacture by spindle head 120 and a tool (not shown) coupled to spindle 125 by keys 126. Working table 132 is affixed to working surface 110 within grooves 130. Therefore, when working surface 110 moves in the X and Y directions, working table 132, or other affixed units, move with working surface 110. Flat upper surface 134 rotates around a rotary C axis (not shown), wherein upper surface 134 rotates about a central axis.

Working parts 112 include a ball screw 138, which facilitates movement of spindle head 120 in the Z1 and Z2 directions during a manufacturing process. Spindle head 120 can move rotatably in the R1 and R2 directions to allow a tool to work on a part mounted on upper surface 134 from different angles during a manufacturing process. Additionally, working surface 110 can move in the Y1 and Y2 directions during a manufacturing process. The described movement of the parts in the X, Y, R, C, and Z directions, in one embodiment, is controlled to achieve tool paths required for forming a part having a geometry specified according to user input in a part program. It should be understood that while the disclosure refers to a five-axis CNC machine, the teachings of the present disclosure are applicable to CNC machines have more or fewer than five axes.

Figure 3:
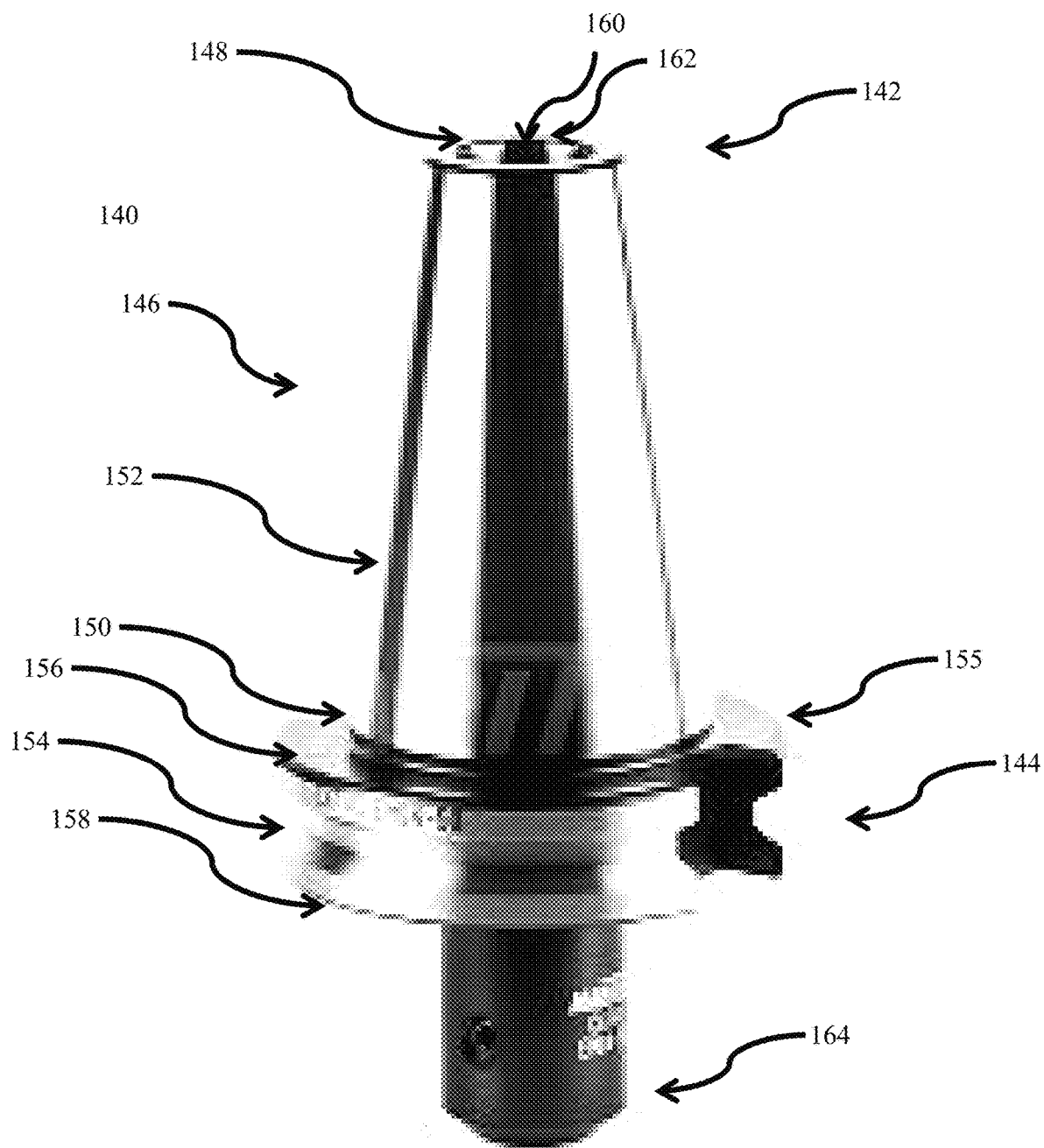
FIGS. 3 and 4 are perspective views of a tool holder.

Now referring to FIG. 3, an exemplary tool holder 140 is shown. Holder 140 has an upper portion 142 and a lower portion 144. A generally conical casing 146 extends from upper portion 142 toward lower portion 144. Casing 146 has a narrow upper opening 148, a broad lower opening 150, and an outer surface 152. A substantially circular outer ring 154 encompasses lower opening 150 and, as shown, has a bracket holder 155. Outer ring 154 includes a lower surface 158 and a flat upper surface 156.

Bracket holder 155 can hold a support bracket (described further below), which in turn may support a filament source or an anti rotate key. Holder 140 may have more or fewer support brackets around outer ring 154 than in the embodiment shown.

Still referring to FIG. 3, holder 140 has a generally conical central spinning member 160, which extends though casing 146 from a narrow top connecting portion 162, to a broad bottom connecting portion 164. When holder 140 is coupled to spindle 125 (shown in FIG. 2), outer surface 152 of holder 140 is held tightly within spindle 125. Keys 126 can aid in coupling holder 140 within spindle 125 by gripping a tab (not shown) above narrow connecting portion 162.

When holder 140 is coupled with spindle 125, upper surface 156 of outer ring 154 abuts against lower surface 127 of spindle 125. Outer surface 152 of holder 140 is coupled and held tightly within spindle 125 when holder 140 and spindle 125 are coupled. Lower surface 158 of outer ring 154 and bottom connecting portion 164, in one embodiment, are used to interchangeably couple with a tool, for example, a self-contained material processing unit or extruder device according to the present disclosure. In other embodiments, no conical central spinning member is required in a tool holder.

Tool holders are known in the art generally, and any tool holder suitable for tightly coupling with a spindle head and providing rotation to a tool coupled with the tool holder at a lower portion of the tool holder is envisioned. In the embodiment of FIG. 3, when tool holder 140 is coupled with spindle 125, spindle 125, casing 146, and central spinning member 160 rotate together. The rotation of holder 140 can provide torque to a generator to power electronics of the material processing unit described below. The directional placement of spindle 125 relative to a part (according to the X, Y, R, C, and Z directions from FIG. 2) controls the directional placement of coupled holder 140. Both the speed of rotation of holder 140 (substantially the same as the rotation of the spindle) and the directional placement of spindle 125 can act as control signals or logic for a material processing unit.

Additionally, holder 140 is removably or interchangeably coupled with spindle 125, such that during a continuous manufacturing program on a CNC machine, tool holders can be coupled with and uncoupled from the spindle automatically (with the aid of an automatic tool changer) when different types of tools, such as additive and subtractive tools, are needed to execute the CNC program.

Figure 4:
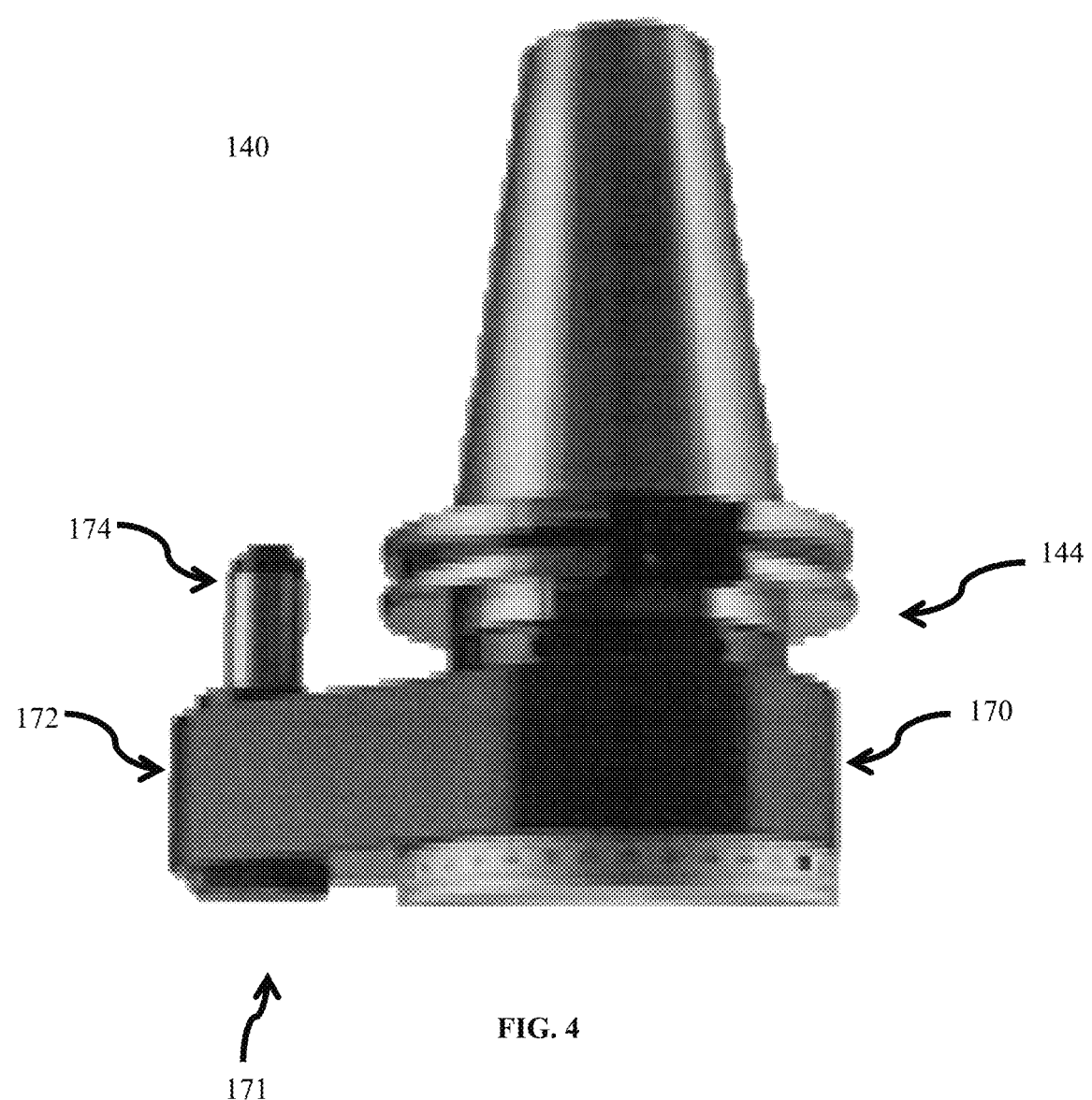

Now referring to FIG. 4, holder 140 is shown with a rotary coupling 170 coupled to holder 140 at lower portion 144. Coupling 170 is generally circular with an oblong protruding portion 171. Protruding portion 171 extends beyond the outer diameter of lower portion 144 of holder 140, and is shown with support bracket 172 and an anti rotate key 174. Anti rotate key 174 is generally cylindrical and is coupled within a bore (not shown) in support bracket 172.

The embodiment shown in FIG. 4 has one support bracket 172 on rotary coupling 170; however, more support brackets could be used, for example for holding a filament supply source at another position on rotary coupling 170. In one embodiment, when holder 140 is coupled with spindle 125 (shown in FIG. 2), anti rotate key 174 couples with head casting 124 of spindle head 120 to prevent rotation of rotary coupling 170. Thereby, components supported by coupling 170, such as a filament supply source as described below, do not rotate with holder 140. Such an exemplary holder may be of the type in the Slimline Series of Alberti Spindle Driven Tools.

Figure 5:
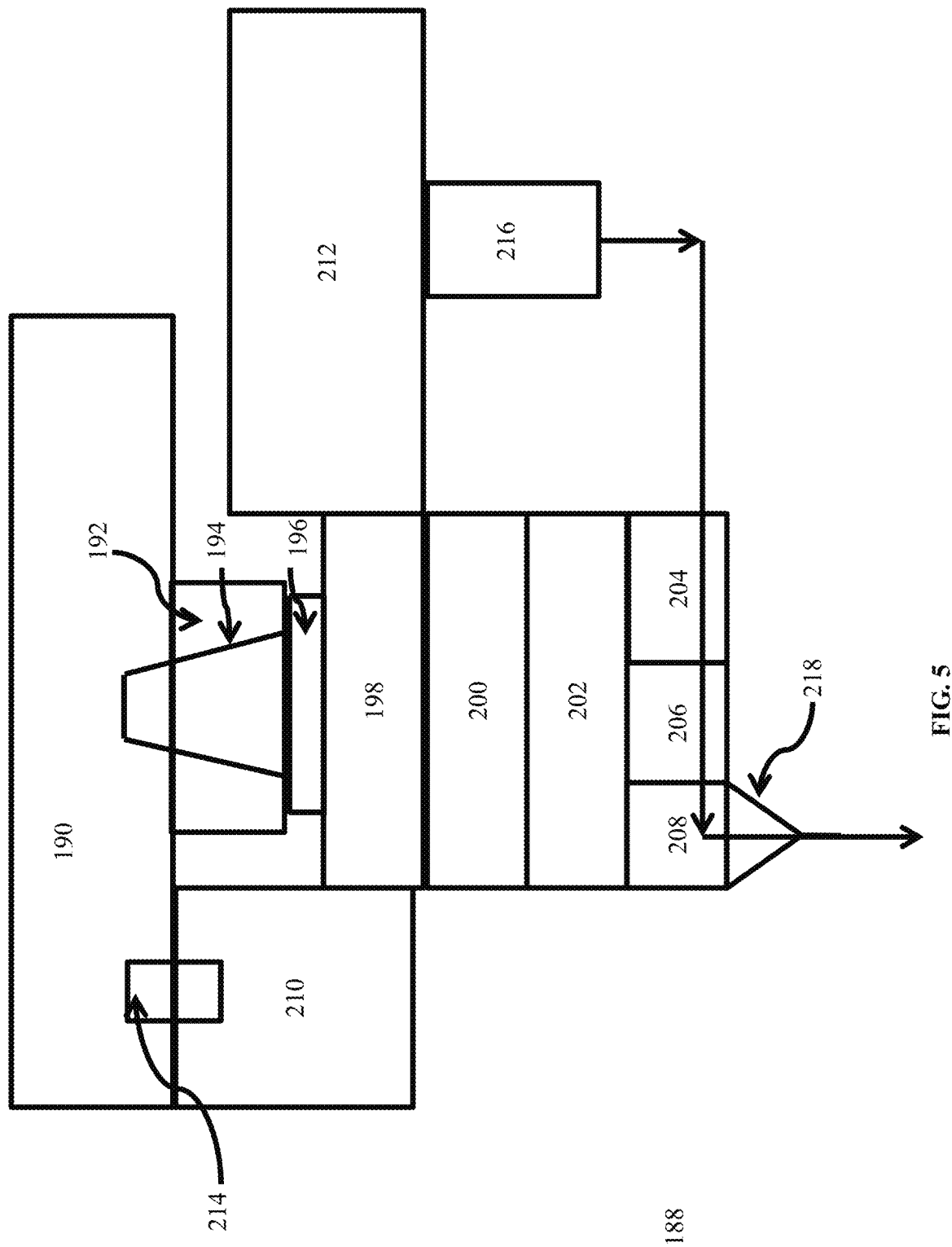
FIGS. 5, 6, and 7 are diagrams representing the components of an exemplary material processing unit and holder adapted to couple to a CNC machine.

Referring now to FIG. 5, a diagram of the components for a self-contained material processing unit 188 is shown. Material processing unit 188 is coupled with a spindle 192 of a CNC machine by a holder 194. Spindle 192 is positioned below a spindle head 190, similar to spindle 125 and spindle head 120 shown in FIG. 2. Thus, material processing unit 188 includes all of the parts shown except spindle 192 and spindle head 190, and material processing unit 188 optionally includes holder 194, or optionally material processing unit 188 is removably coupled to holder 194. In some embodiments, the components displayed in FIGS. 2-4 are representative of the components referred to in FIGS. 5-7 and 10.

Still referring to FIG. 5, holder 194 has an outer ring 196. These components might be similar to holder 140 and outer ring 154 of FIG. 3. Rotary coupling 198, which may be similar to rotary coupling 170 shown in FIG. 4, couples holder 194 and outer ring 196 to a generator 200, a microcontroller 202, a heater 204, a stepper motor 206, an extruder 208, and a feeder 218. A support bracket 210 and anti rotate key 214 are shown, and may be similar to support bracket 172 and anti rotate key 174 shown in FIG. 4. In the embodiment shown, the support bracket 210 is coupled to rotary coupling 198. The components shown in FIG. 5 may not be visible when material processing unit 188 is in use, and the units may be covered by removable covers or sheaths.

Notably, the components of material processing unit 188 may be differently arranged or configured to provide an efficient device. For example, stepper motor 206 and extruder 208 may precede heater 204, or optionally there may be no stepper motor 206. Other means to feed filament from filament supply source 216 to feeder 218 may be used such as one or more servo motors, linear actuators, devices to apply positive pressure, devices to apply a vacuum, and any suitable actuator known in the art.

Anti rotate key 214, positioned between spindle head 190 and support bracket 210, optionally can incorporate a power supply port or other supply lines between spindle head 190 of CNC machine 100 and support bracket 210 of material processing unit 188. In this way, material processing unit 188 could be supplied with power through anti rotate key 214. Additional supply lines, possibly providing a fluid necessary for use with material processing unit 188, or other operational elements required by material processing unit 188 could also be provided from spindle head 190 to material processing unit 188 through anti rotate key 214.

Rotary coupling 198 includes a second support bracket 212, which is coupled to a filament supply source 216. In the embodiment shown, holder 194 and outer ring 196 rotate or spin when spindle 192 rotates. Spindle head 190 is stationary when spindle 192 rotates, and when rotary coupling 198 has anti rotate key 214 coupled to spindle head 190, rotary coupling 198, generator 200, microcontroller 202, heater 204, stepper motor 206, extruder 208, support bracket 210, support bracket 212, anti rotate key 214, and filament source 216 do not rotate with spindle 192, holder 194, and outer ring 196.

Rotary coupling 198 allows spindle 192 and holder 194 to provide rotation within generator 200. In some embodiments, rotary coupling 198 has one or more internal bearings or gear boxes. In one embodiment, generator 200 is a DC generator; however, the use of other generator types is contemplated. In some embodiments, generator 200 provides power to other units requiring power in material processing unit 188, such as microcontroller 202, heater 204, stepper motor 206, and extruder 208. Any suitable wiring configuration between generator 200 and other parts requiring power is envisioned. The generator may be directly wired to other components, or the components may be wired in series or using other configurations known in the art. Generator 200 also can charge one or batteries (not shown) in material processing unit 188.

Extruder 208 is fed a filament by filament supply source 216. In some embodiments, filament supply source 216 is coupled to support bracket 212, which is coupled to rotary coupling 198, but in other embodiments the filament supply source need not be attached to material processing unit 188. More filament supply sources could be used with material processing unit 188 to provide a single mixed feed, multiple separate feeds, or multiple mixed feeds. Filament supply source 216 can be any container capable of holding a filament or other extrudable material used in 3D printing. In certain embodiments, filament supply source 216 represents a box, a spool, a reel, or any other unit capable of holding plastic, rubber, metal, or other filament used in 3D printing. Filament supply source 216 can be permanently or interchangeably mounted to material processing unit 188. An illustrative filament supply source has 2 or more chambers holding 2 or more materials, which can be expelled and mixed by applying positive pressure to a plunger via linear actuation, such as an epoxy mix.

The filament flow is shown by the straight arrows in FIG. 5 proceeding from filament supply source 216 through heater 204, stepper motor 206, and extruder 208, and out through feeder 218. Heater 204 provides heat to the filament to make the filament malleable and flowable so that it will exit through feeder 218, which can have cross sections of differing shapes and diameters.

The terms "extruder" and "extrusion" as used herein refer to a continuous or semi-continuous process of drawing or pushing a malleable or flowable material through a feeder of a desired cross section. Thus, stepper motor 206 can be any motor capable of drawing or pushing filament into the heater and pushing the filament through the extruder and feeder. However, in other embodiments, a stepper motor is not required if the flow from the filament supply through the heater, to the extruder, and out through the feeder is continuous based on the feed of the filament and the viscosity of the material. For instance, a filament supply source may itself unwind, thus providing material to a heater, and once heated, if the viscosity of the filament is low enough, it may flow without a stepper motor through the extruder and feeder to a part in a workspace.

Material processing unit 188 may further comprise cooling fans, heat sinks, and/or cooling loops, optionally controlled by microcontroller 202, to take part in controlling the temperature of components such as heater 204 and extruder 208.

Figure 7:
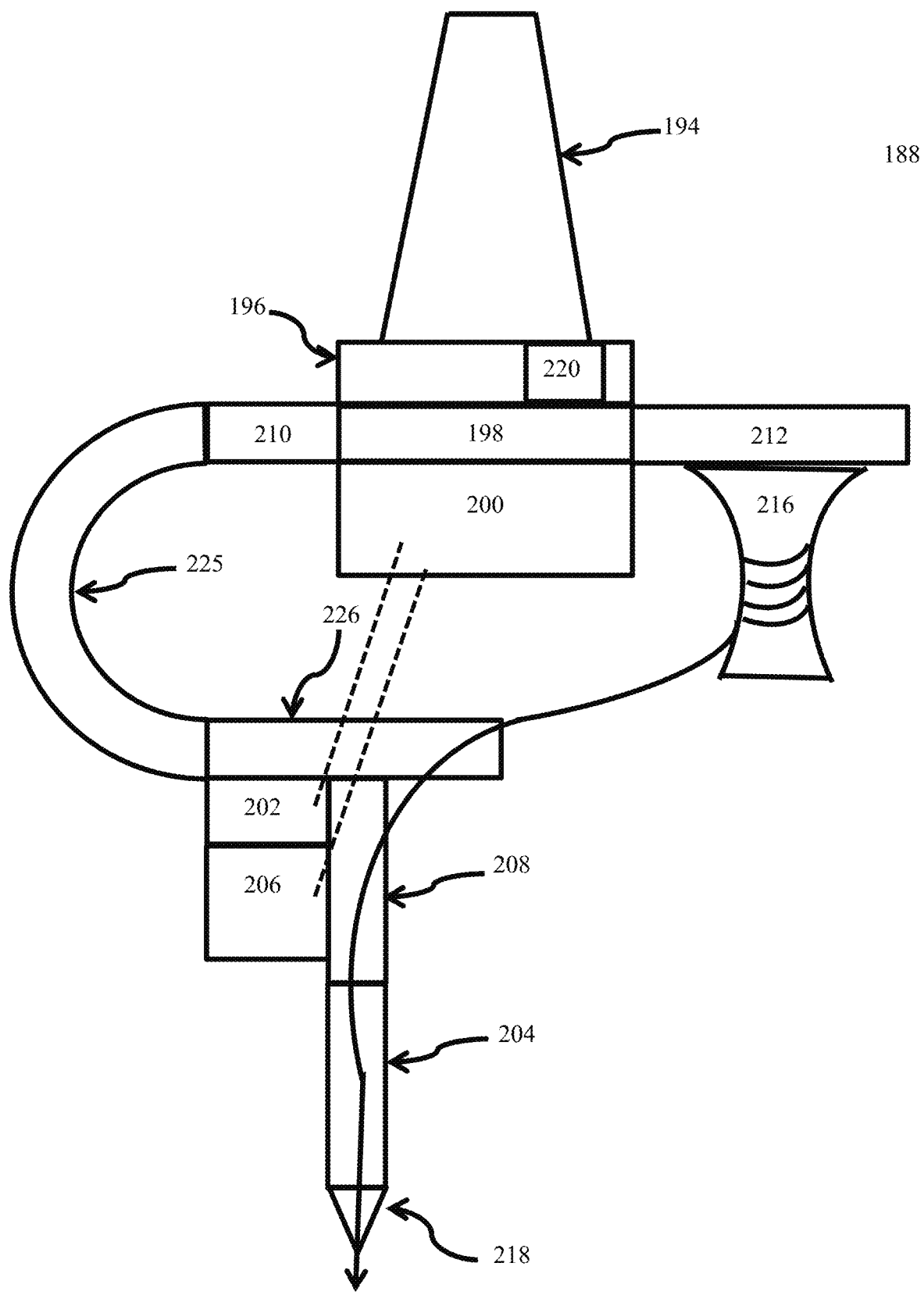
Figure 10:
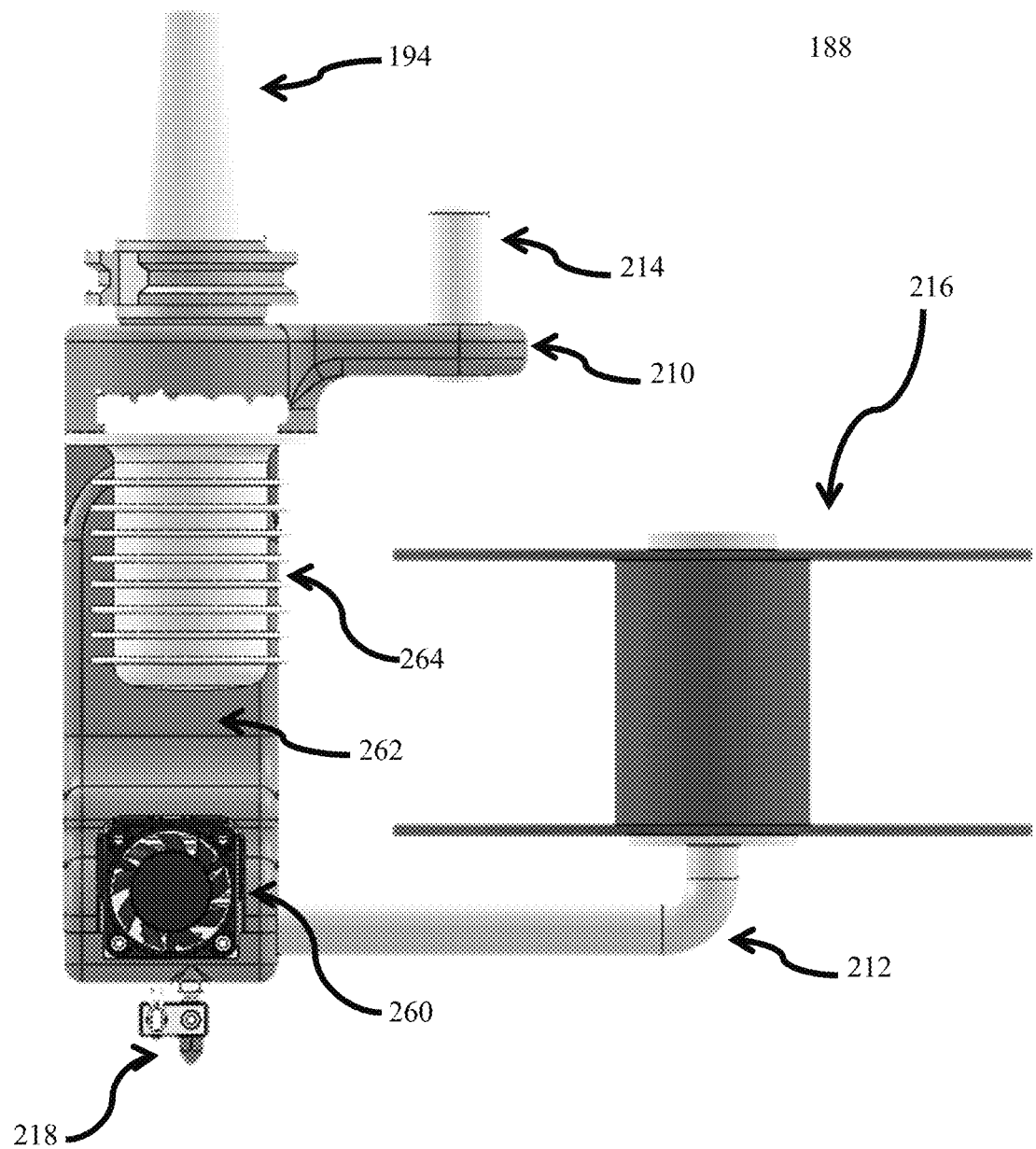
FIG. 10 is a front perspective view of an illustrative embodiment of the material processing unit described in FIGS. 5, 6, and 7.

The ordering of components in FIG. 5 is only representative of one possible configuration of a self-contained extruder unit, and any other workable ordering or configuration of the parts is envisioned, such as that shown in FIGS. 7 and 10. Feeder 218 may be configured, in some embodiments, to house other components such as heater 204, to provide heat for a filament feed.

Figure 6:
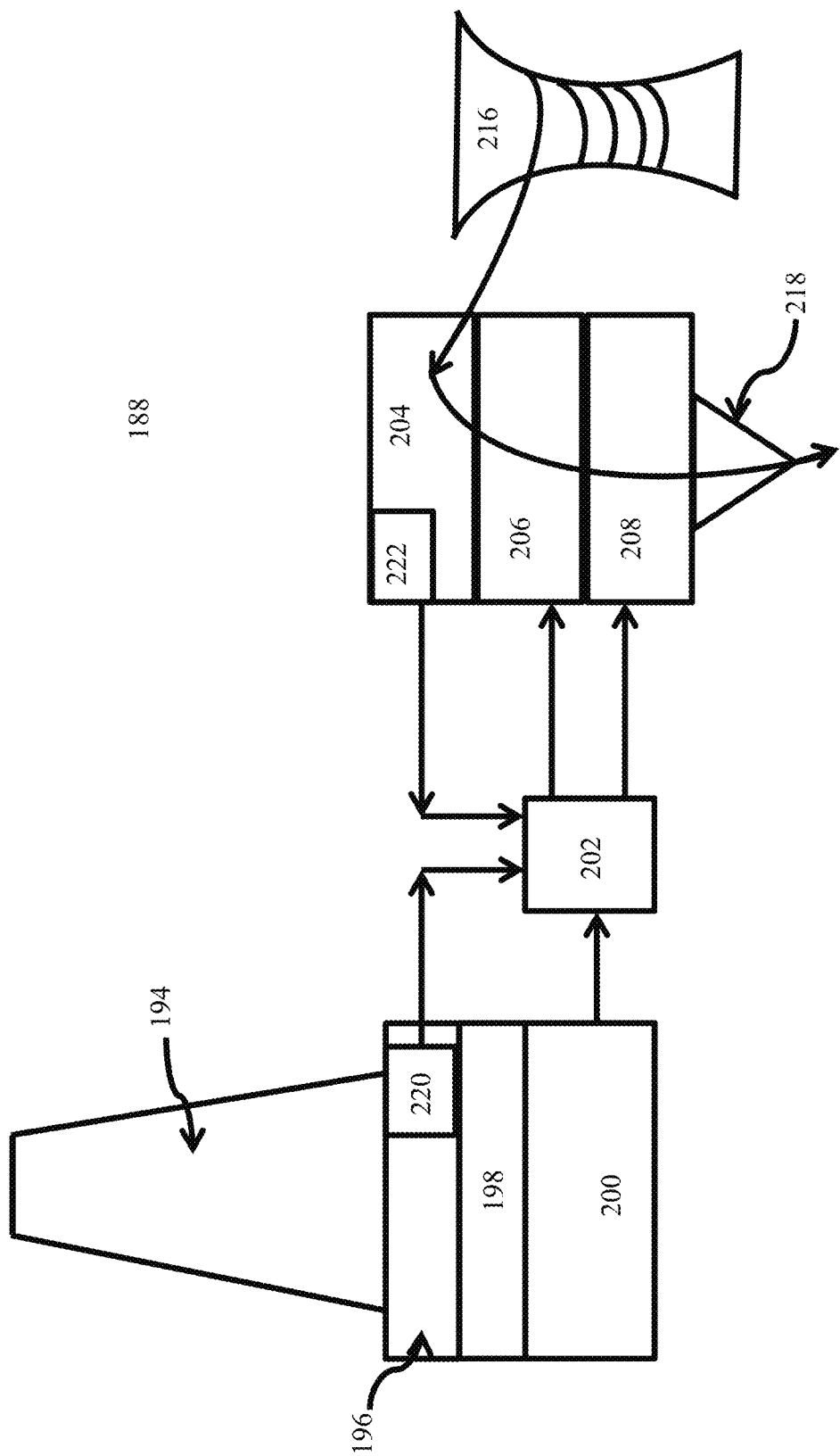

Referring now to FIG. 6, a conceptual diagram representing the components of self-contained material processing unit 188 is shown. As noted, when holder 194 and outer ring 196 are coupled to the spindle of a CNC machine (represented by spindle 192 in FIG. 5) holder 194 and outer ring 196 rotate when the spindle is rotating. A rotary speed sensor 220 measures and determines the speed of rotation of the spindle, which is substantially the same as the speed of rotation of holder 194, because they are coupled together. The arrows between speed sensor 220 and microcontroller 202 represent the information tracked by speed sensor 220 being fed to microcontroller 202. The information regarding the speed of rotation of spindle 192 can be gauged using one or more of any rotational speed monitor or sensor known in the art, which might be located on spindle 192, on holder 194, or might be located away from and not in contact with material processing unit 188. Additionally, the information regarding speed of rotation may be transferred through a wired connection, wirelessly, or through a network to microcontroller 202 or other control devices.

In one embodiment, microcontroller 202 is programmed to control the operating state of heater 204, stepper motor 206, and extruder 208. In some embodiments, microcontroller 202 is pre-programmed to operate based only on the speed of rotation of the spindle and is independent of outside user input. Microcontroller 202, then, using logic (described further below) interprets when to deposit material, or perform another material processing function, based only on the speed of the spindle, as gauged by speed sensor 220, and need not communicate directly with the controls of CNC machine 100. In other embodiments, users input logic for microcontroller 202, possibly through control console 102 of CNC machine 100 with CAD and CAM programs.

In still other embodiments, microcontroller 202 has at least three modes. In a first mode, heater 204, stepper motor 206, and extruder 208 are in an "off" state or not operational. Such a mode is necessary for CNC machine 100 when spindle 125 is required to switch out material processing unit 188 for another tool, possibly a subtractive tool. An off state is also necessary for situations when CNC machine 100 is not in use.

In a second mode, heater 204 is in an operational or "on" state to heat filament within the heater, making it malleable and flowable. In one embodiment, stepper motor 206 pulls filament from filament supply source 216, to heater 204. In other embodiments, the filament supply source itself feeds the filament to the heater by unwinding, turning, dispensing, or any other feeding means. The feeding means of the filament supply source, as well as all of the other units on material processing unit 188, can be powered by generator 200.

In a third mode, extruder 208 feeds or deposits material through feeder 218. In this mode, heater 204 and stepper motor 206 (if used) are operational, as filament is transferred from filament supply source 216 into heater 204. In other embodiments, more or fewer modes of operation exist, such as modes in which heater 204 operates at different temperatures (see for example Table 1). Still in other embodiments, the mode in which heater 204, stepper motor 206, and extruder 208 are operating is controlled by the speed of rotation of the spindle of a CNC machine as it is measured by speed sensor 220, and interpreted by microcontroller 202. For example, if the rotations per minute ("RPM") of the spindle are between 0 and 4,999 RPM, heater 204, stepper motor 206, and extruder 208 are in an "off" mode, wherein they are not operational. If the speed of the spindle is increased to between 5,000 and 5,099 RPM, the mode changes into a "heat" mode in which heater 204 is operational, possibly along with stepper motor 206, depending on whether filament needs to be drawn into heater 204 to be heated.

Furthermore, if the speed of the spindle increased to 5,100 RPM or higher, then heater 204, stepper motor 206, and extruder 208 enter a "feed" mode, and the heated filament is continuously fed through feeder 218 to a part in workspace 108 shown in FIG. 1. Microcontroller 202 can be adapted to receive programming logic for operating modes from the controls of the CNC machine and from external computing programs. Alternatively, a microcontroller can be programmed through a wired or wireless connection, or over a network. Microcontroller 202 also can be adapted to have memory.

Furthermore, microcontroller 202 can be adapted as a component in a circuit board or circuit configuration in material processing unit 188. The rotation speeds provided above are for example only, and any speed ranges (such as those shown in Table 1) could be used to denote modes of operation, so long as the rotation speed provides sufficient rotation to the generator to power necessary components in the desired mode (if the rotation is being used to power the material processing unit). In other embodiments, microcontroller 202 is programmed to control modes of operation based on the position of a spindle or spindles within a CNC machine.

Therefore, in one embodiment, programming input by a user can be used to control the spindle speed and/or spindle position of a CNC machine, which in turn allows a programmed microcontroller to determine proper modes of operation of a material processing unit, such as an extruder, such that the extruder deposits material at appropriate times during a continuous, automated manufacturing program. In other embodiments, depending on the temperature of the heater required to heat a filament type and the overall power demand of the components, the rotation of the spindle may be controlled to provide more or less rotation to the generator.

Other embodiments of the invention include not just self-contained extruder units, but also self-contained material processing units, wherein the operating state of the material processing unit, selected from a variety of potential operating states, is controlled, at least in part, by the speed of rotation of the spindle of a CNC machine. For example, in a first rotational speed range of the spindle, a material processing unit would perform a first function, and in a second rotational speed range of the spindle, the material processing unit would perform a second function. A self-contained material processing unit might contain dual extrusion units (possibly two or more units similar to that pictured in FIG. 5) and a mixing head such that two or more materials could be extruded or otherwise added side-by-side to a part, applied separately to a part, or applied to a part in various mixed material ratios.

In one embodiment, multiple materials are added to a workspace in varying ratios, wherein the ratios are controlled by the speed of the spindle. The materials might include metals, rubbers, plastics, epoxies, composite materials, glues, or any other material for use in machining parts. Additionally, a self-contained material processing unit may include subtractive tools, such as cutting tools, grinders, etc., which operate in different operating states, and possibly alternatingly with additive units, based on the speed of rotation of the spindle of the CNC machine. The material processing unit might have one or more lasers, welders, arc welders, material curing devices, UV lights, heaters, coolers, air streams, water streams, or any other unit which would be useful in a CNC machine.

Table 1 below provides one illustrative embodiment of the present disclosure, wherein varying speed ranges of the spindle of a CNC machine are used to control operating states of a self-contained, automatically connectable and removable material processing unit.

TABLE 1

Control functions based on varying spindle rotational speeds in RPM.

| Spindle RPM | System Reset | Lower Calibration | Optional Functions | Mix Ratio (% A/B) | Middle Calibration | Primary Heating (deg C.) | Secondary Heating (deg C.) | Feed Rate- (Part "A"/ Part "B") (mm/s) | Upper Calibration |
|---|---|---|---|---|---|---|---|---|---|
| 0 | Full System Reset | | | | | | | | |
| 1000 | | Set Calibration | | | | | | | |
| 1100 | | | Turn Off Heat & Cool Down | | | | | | |
| 1200 | | | Standby- Repeat Settings | | | | | | |
| 1300 | | | Save Cal., Reprogram Settings | | | | | | |
| 3000 | | | | 0 (Single or No Mix) | | | | | |
| 3020 | | | | 2 | | | | | |
| 3040 | | | | 4 | | | | | |
| 3060 | | | | 6 | | | | | |
| 3080 | | | | 8 | | | | | |
| 3100 | | | | 10 | | | | | |
| 3200 | | | | 20 | | | | | |
| 3900 | | | | 90 | | | | | |
| 4000 | | | | | Set Calibration | | | | |
| 4100 | | | | | | | | 100 | |
| 4125 | | | | | | | | 105 | |

TABLE 1-continued

Control functions based on varying spindle rotational speeds in RPM.

| Spindle RPM | System Reset | Lower Cali-bration | Optional Functions | Mix Ratio (% A/B) | Middle Cali-bration | Primary Heating (deg C.) | Secondary Heating (deg C.) | Feed Rate- (Part "A"/ Part "B") (mm/s) | Upper Cali-bration |
|---|---|---|---|---|---|---|---|---|---|
| 4150 | | | | | | 110 | | | |
| 4175 | | | | | | 115 | | | |
| 4200 | | | | | | 120 | | | |
| 4800 | | | | | | 220 | | | |
| 5300 | | | | | | 340 | | | |
| 5400 | | | | | | | 100 | | |
| 5425 | | | | | | | 105 | | |
| 5450 | | | | | | | 110 | | |
| 5475 | | | | | | | 115 | | |
| 5500 | | | | | | | 120 | | |
| 6000 | | | | | | | 220 | | |
| 6600 | | | | | | | 340 | | |
| 6700 | | | Stay Heated & Repeat Settings | | | | | | |
| 6750 | | | Change Filament | | | | | | |
| 6800 | | | | | | | | 50 (OFF/OFF) | |
| 6810 | | | | | | | | 50 (ON/OFF) | |
| 6820 | | | | | | | | 50 (ON/ON) | |
| 6830 | | | | | | | | 50 (OFF/ON) | |
| 6840 | | | | | | | | 52 (OFF/OFF) | |
| 6850 | | | | | | | | 52 (ON/OFF) | |
| 6860 | | | | | | | | 52 (ON/ON) | |
| 6870 | | | | | | | | 52 (OFF/ON) | |
| 6880 | | | | | | | | 54 (OFF/OFF) | |
| 6890 | | | | | | | | 54 (ON/OFF) | |
| 6900 | | | | | | | | 54 (ON/ON) | |
| 6910 | | | | | | | | 54 (OFF/ON) | |
| 7000 | | | | | | | | 60 | |
| 7400 | | | | | | | | 80 | |
| 7800 | | | | | | | | 100 | |
| 9800 | | | | | | | | 200 | |
| 10000 | | | | | | | | | Set Cali-bration |

Of course, Table 1 is exemplary only, and other speed ranges may be used for the functions shown or other functions of the device. As shown in Table 1, at different spindle speed ranges (provided in RPM), the Feed Rate- (Part "A"/Part "B") (mm/s) can vary, and different feeds can be in an "on" or "off" state. Additionally, in other embodiments, the spindle speed ranges provided could change between an operational state and a non-operational state for components, including, but not limited to, UV lights, lasers, metal feeds, grinders or other subtractive tools, air streams, fluid streams, cooling or heating units, etc. The control logic based on RPM speed can control modes for device calibration and different heating temperature ranges for a heating unit. Essentially, Table 1 is intended to depict that any of a variety of operations of a material processing unit according to the present disclosure may be controlled by the speed of the spindle of the CNC machine tool.

The speed range logic can also be used to control single feeds, dual feeds, or other multiple feeds, mix ratios for dual or other mixed feeds, different feed rates for extrusion, a mode for changing a filament feed tube or stick, refilling the filament feed supply source, repeating a previous program, turning on or off curing lights, heaters, coolers, fluid streams, lasers (or other etching or cutting tools). All of these features can be controlled exclusively depending on the RPM speed or speed range of the spindle, and optionally based on the direction of the rotation of the spindle relative to working space 108. In other embodiments, such functions could be controlled based on the positioning of one or more spindles within a three-dimensional working space of the CNC machine.

The microcontroller in such a material processing unit optionally would interact with a user interface with LED lights and displays, audible alarms, and/or a user I/O interface. Such a user interface might be similar to control console 102 of CNC machine 100, or the user interface might be located on material processing unit 188. In some embodiments, microcontroller 202 is programmed to shut down material processing unit 188 when measurements, such as temperature, are outside of a desired range. In other embodiments, microcontroller 202 and a display are programmed to warn a user when measurements, such as temperature, are outside of a desired range. Spindle speed in RPM can be monitored by a user in a variety of ways, possibly by a display on material processing unit 188, or possibly on the pre-existing user controls of a CNC machine. Exemplary material processing unit 188, optionally with a display, can also have one or more internal batteries.

Still referring to FIG. 6, a thermistor 222, or similar temperature measurement device, is adapted to measure the temperature of heater 204. Thermistor 222, or similar temperature measurement device, optionally provides a feedback to microcontroller 202, and microcontroller 202 optionally controls the mode of heater 204 according to the temperature; i.e. if the temperature of heater 204 is too high, the mode may be switched to an off state even if the rotation speed of the spindle is at a speed indicating to microcontroller 202 the operating state of the heater should be an on state.

Referring now to FIG. 7, a diagram for an alternative arrangement of the components of material processing unit 188 is shown. The numbers largely refer to components described earlier with regard to FIGS. 5 and 6. In the embodiment of FIG. 7, support arms 225, 226 are shown supporting components of material processing unit 188 such as microcontroller 202, stepper motor 206, heater 204, extruder 208, and feeder 218. Support arm 225 is coupled with support bracket 210 on rotary coupling 198. The dotted lines represent electrical connections from generator 200 to other components requiring electricity, such as microcontroller 202.

Figure 8:
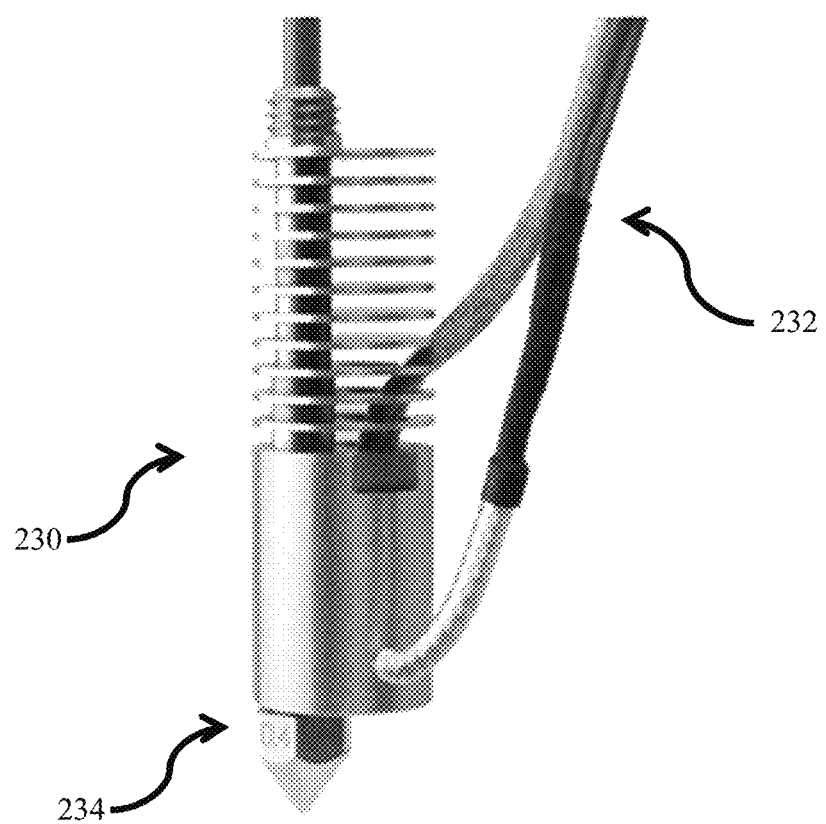
FIG. 8 is a perspective view of an extruder and heater.

Now referring to FIG. 8, one embodiment of a commercially available combination heater and extruder 230 is shown. Combination heater and extruder 230 could be used in material processing unit 188 shown in FIGS. 5-7 and 10. Combination heater and extruder 230 could use a stepper motor, or similar device to provide feed from a filament supply source, such as a Servo motor or linear actuator. Feed lines 232 provide heater and extruder 230 with power and filament feed. When in an on or operating state, combination heater and extruder 230 provides a malleable and flowable filament to a part in a space through feeder 234.

Figure 9:
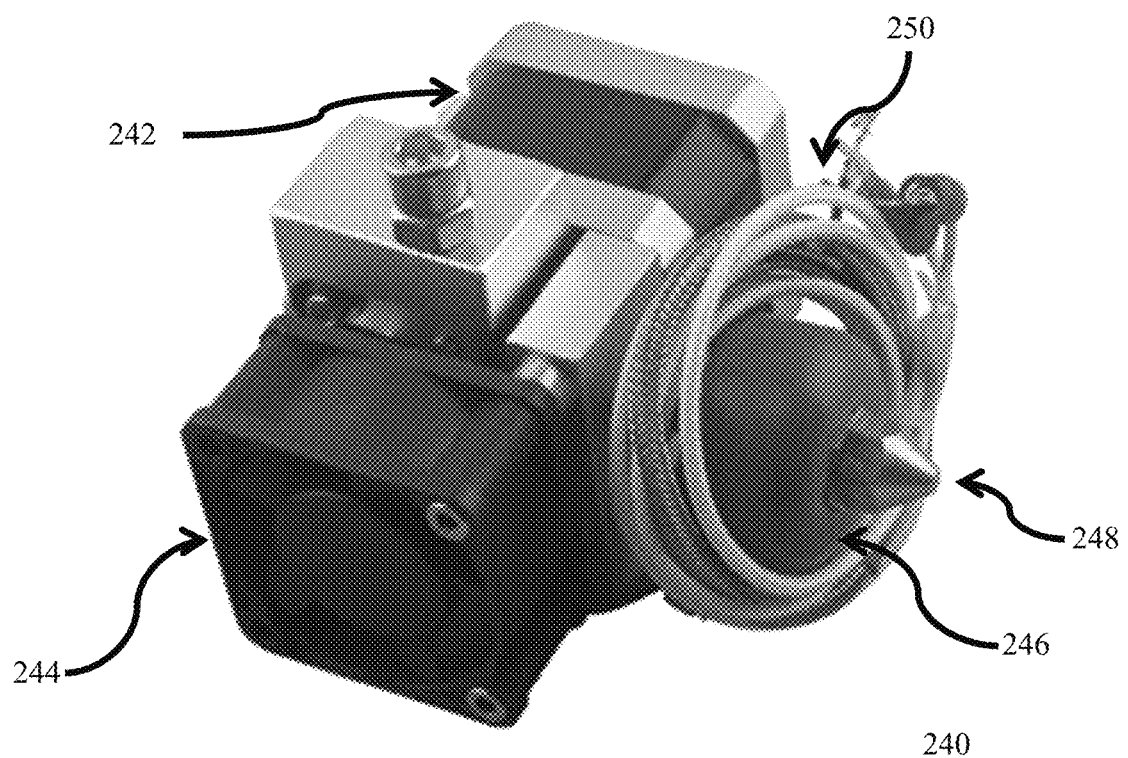
FIG. 9 is a perspective view of a 3D printer head assembly.

Referring now to FIG. 9, a commercially available 3D printer head assembly 240 is shown. Assembly 240 has a heater 242, a stepper motor 244, an extruder 246, a feeder 248, and feed lines 250 to provide heater 242 and extruder 246 with power and filament feed. In one embodiment, assembly 240 could be used in material processing unit 188 of FIGS. 5-7 and 10.

Referring now to FIG. 10, a front perspective view of an illustrative embodiment of the self-contained material processing unit described in FIGS. 5-7 is shown. Numbered components described above in FIGS. 5-7 refer to similar components, such as holder 194, anti rotate key 214, filament supply source 216, support bracket 212, and feeder 218.

As described above, anti rotate key 214 optionally can incorporate a power supply port or other supply lines between spindle head 190 of CNC machine 100 and support bracket 210 of material processing unit 188. In this way, material processing unit 188 could be supplied with power through anti rotate key 214 or other required operational elements, such as a fluid, for use with material processing unit 188. For example, in one embodiment, if material processing unit 188 required oil, water, air or another fluid in a loop, possibly for cooling, this could be provided via the coupling with anti rotate key 214. Filament supply source 216, as shown, is a reel; however, other sources such as a tube, box, or tank may be used, and filament might flow through support bracket 212 to feeder 218.

Still referring to FIG. 10, a plate 262 is shown, which can incorporate a circuit board or control panel. A microcontroller, such as microcontroller 202 in FIG. 6, could be incorporated into plate 262. Plate 262 optionally has a user interface with LED lights and displays, audible alarms, and user controls. Alternatively, such a microprocessor, circuit board, or control panel could be placed elsewhere on material processing unit 188. Material processing unit 188, optionally with a display, also has one or more internal batteries in some embodiments. In an illustrative embodiment, material processing unit 188 also has a memory and wired and/or wireless network connections for user input and control.

FIG. 10 also shows material processing unit 188 with an optional baffled sheath 264 covering or housing components, such as generator 200 of FIGS. 5-7. Other components could also be covered or housed, such as a battery wired to generator 200. A heat control unit 260 is provided, and optionally comprises one or more fans, baffles, cooling loops and/or heat sinks. Heat control unit 260 contributes to control of the temperature of units in material processing unit 188, such as generator 200, microcontroller 202, heater 204, stepper motor 206, and extruder 208 from FIGS. 5-7.

Optionally, the rotation speed of the spindle can control the level of cooling provided by heat control unit 260 to help control the temperature of units as shown in Table 1 above. For example, if material processing unit 188 is switched from secondary heating at 220° C. (6,000 RPM spindle speed) to primary heating at 115° C. (4,175 RPM spindle speed), then microcontroller 202 could signal heat control unit 260 to contribute to cooling of heater 204, while simultaneously reducing the power provided to heater 204. Heat control unit 260 is envisioned to incorporate any combination of fans, sinks, baffles, cooling loops, or other cooling or heat control means known in the art.

Figure 11:
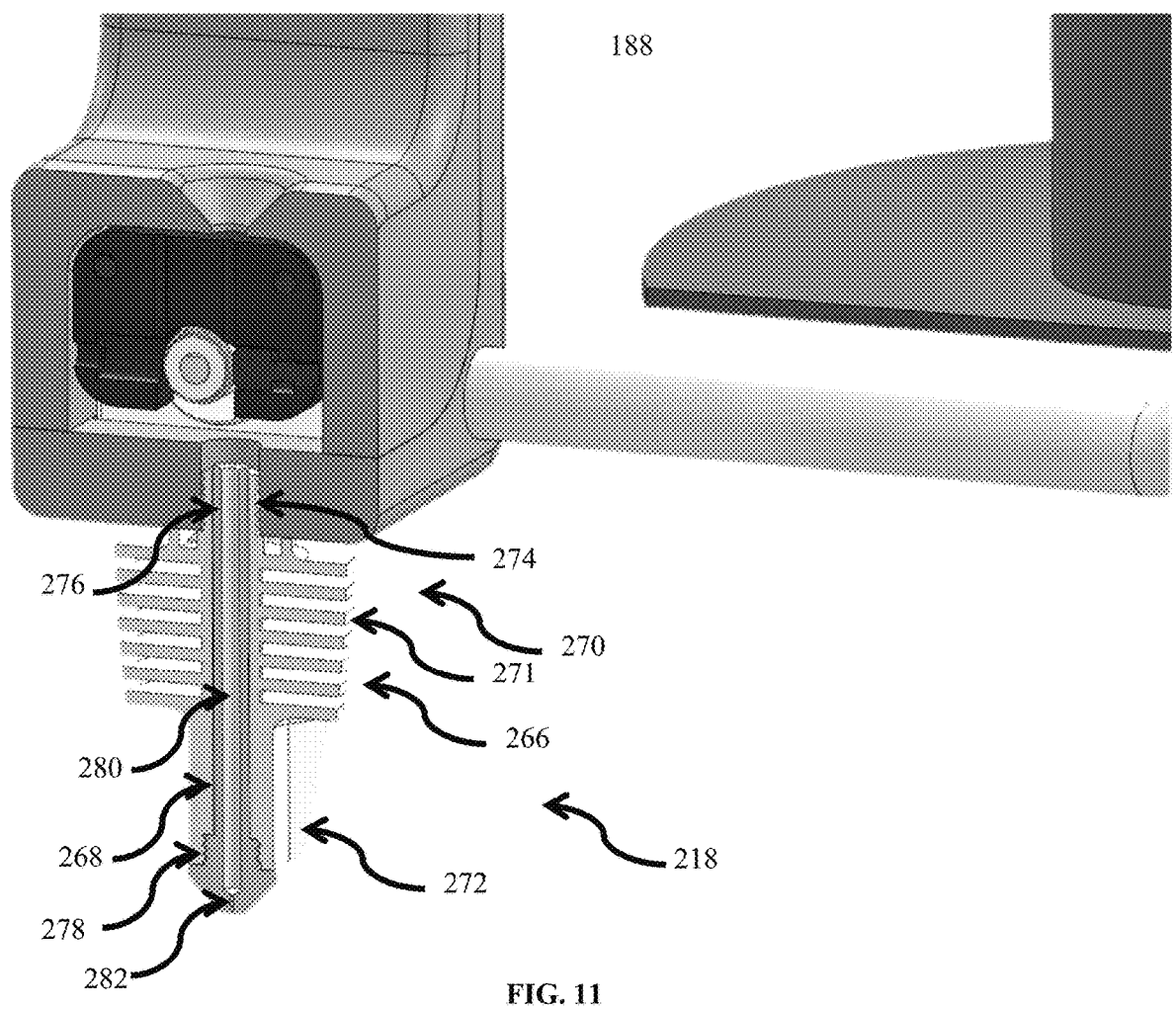
FIGS. 11 and 12 are a front cut-away views of an exemplary feeder.
Figure 12:
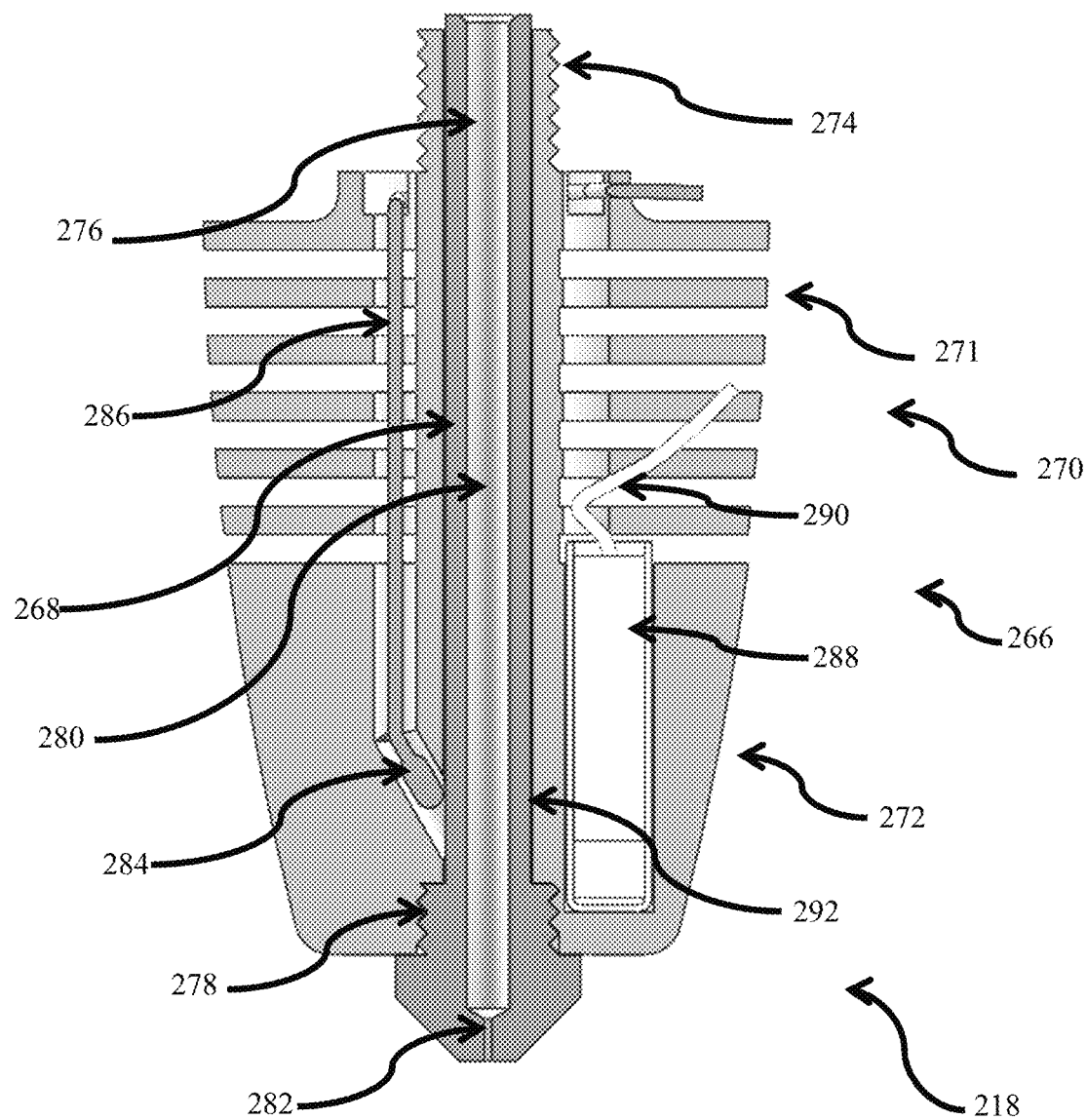

Referring now to FIGS. 11 and 12, front cut-away views of an exemplary feeder are shown. Feeder 218 includes outer support 266 and inner nozzle 268. In the embodiment shown, outer support 266 has baffled upper portion 270 and a substantially cylindrical lower portion 272. Outer support 266 houses or encloses nozzle 268. In other embodiments, different shapes are envisioned for outer support 266, based on the cross section of the nozzle required for a particular type of filament feed. Outer support 266 is also shown with an upper threaded portion 274, which in the embodiment shown allows coupling with material processing unit 188. Other coupling means are envisioned, such as magnets or electromagnets. The coupling means can allow for fast and simple interchangeability of feeder 218 during a continuous CNC machining process. Feeder 218 can be changed based on the feed type and the desired cross section of nozzle 268; however, nozzle 268 can be changed without removing outer support 266 (described further below).

Baffled upper portion 270 includes individual baffles 271, which allow for dissipation of heat at upper portion 270 such that filament would not melt before entering nozzle 268, wherein it can be heated. Such baffles are optional; however, in one embodiment individual baffles 271 greatly reduce or possibly eliminate the need for a fan or heat sink such as heat control unit 260 shown in FIG. 10.

Nozzle 268 has an upper portion 276, a lower threaded portion 278, a central feed channel 280, and a material outlet 282. Central feed channel 280 allows for the feed of a flowable, malleable material through central feed channel 280 and out of outlet 282 into a workspace of a CNC machine. Nozzle 268 is interchangeable within outer support 266, because lower threaded portion 278 allows for insertion and removal of nozzle 268 within outer support 266. Thus, during a continuous automated manufacturing process, if different feed types (such as rubber vs. plastic) require different cross sections of central feed channel 280 and/or outlet 282, the entire feeder 218 could be interchanged, or only nozzle 268 could be interchanged while outer support 266 remained coupled with material processing unit 188. Different central feed channels and/or different outlet sizes include, but are not limited to, about 1.75 mm, about 3.0 mm, and about 5.0 mm. Once again, coupling means other than or in addition to threads are envisioned, such as magnets or electromagnets.

In some embodiments, central feed channel 280 of nozzle 268 is divided into two or more feed channels to feed multiple filament types to outlet 282 wherein the multiple filament types would be mixed before placement in workspace 108 of CNC machine 100. In other embodiments, multiple feed channels would feed to multiple, individual outlets and the filament feeds would not be mixed before placement in workspace 108 of CNC machine 100.

Referring now to FIG. 12, outer support 266 includes a thermistor 284 positioned within lower portion 272. In other embodiments, thermistor 284 can be any device used to measure the temperature of nozzle 268 and/or outer support 266, such as a thermocouple. Connection 286 connects thermistor 284 with microcontroller 202 of material processing unit 188 of FIGS. 5-7 and 10. Connection 286 also includes wires or similar means to power thermistor 284. Thermistor 284 gauges the temperature of feeder 218 near lower threaded portion 278 of nozzle 268, and this would be substantially similar to the temperature of feed provided through central feed channel 280 to outlet 282.

The temperature gauged by thermistor 284 is fed into microcontroller 202 by connection 286, and microcontroller 202, in one embodiment, would correct the temperature of the feed. For example, if microcontroller 202 of material processing unit 188 interpreted spindle speed at 4,125 RPM, based on the logic presented in Table 1 above, the heater should be in primary heating, heating the feed to 105° C. However, if thermistor 284 gauged the temperature near lower threaded portion 278 to be 145° C., microcontroller 202 could reduce the power provided to heater 204, or optionally increase the cooling provided by heat control unit 260.

Lower portion 272 also includes a cartridge style heating element 288, which is powered by connection 290 in order to heat feeder 218 to the desired operating temperature. Connections 286, 290 to thermistor 284 and heating element 288, respectively are optionally connected to an electronic control board, described with regards to plate 262 in FIG. 10. The electronic control board could supply power to heating element 288 to heat feeder 218 to the desired temperature. The control board with microcontroller 202 would use the signal from thermistor 284 to monitor the temperature of feeder 218 and turn the power to heating element 288 on and off (or vary the temperature) to maintain the correct operating temperature. Once again, in some embodiments, the power required is provided by a generator within the material processing unit provided rotation by a spindle.

In some embodiments, thermistor 284 and heating element 288 would be adhered to outer support 266 using a glue, bonding agent, cement, or similar adhesive means that is thermally conductive. A thermally conductive compound would allow for thorough heat transfer between the components of feeder 218 and allow for permanent bonding between nozzle 268 and outer support 266 if required. As described above, nozzle 268 can be interchangeable within outer support 266, and at an interface 292 between nozzle 268 and outer support 266, there is optionally a thermally conductive compound applied to allow for thorough heat transfer between nozzle 268 and outer support 266. Such a compound includes, but is not limited to, a paste or grease applied to nozzle 268 during interchange or replacement, and such a material would not permanently bond nozzle 268 to outer support 266.

Figure 13:
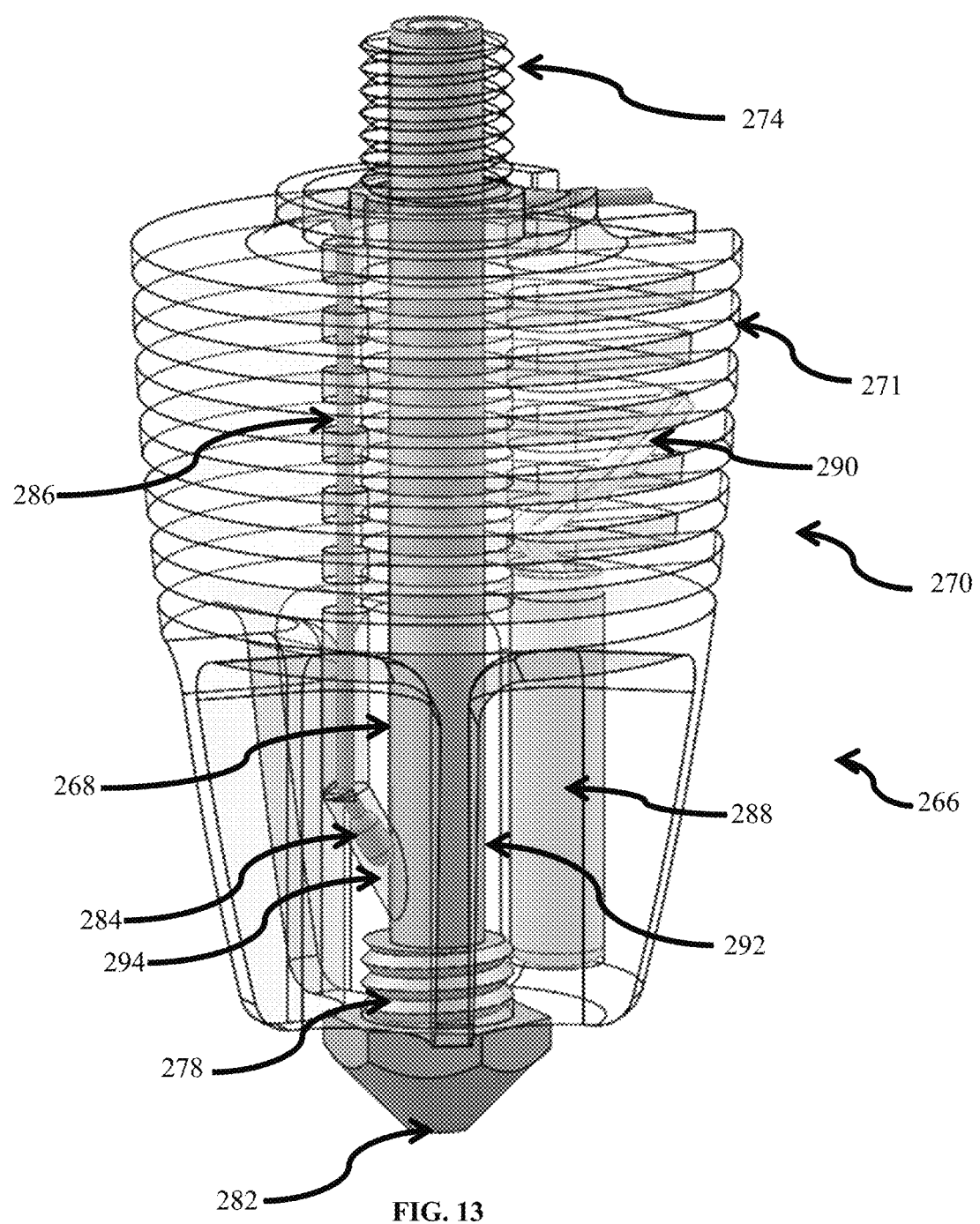
FIG. 13 is a three-dimensional perspective view of the exemplary feeder.

Referring now to FIG. 13, a three dimensional perspective view of an exemplary feeder 218 is provided. Thermistor 284 is shown positioned within a sheath 294 near lower threaded portion 278. While in the embodiment shown, nozzle 268 and outer support 266 are substantially cylindrical and have substantially circular cross sections, outlet 282 may be of any cross sectional size and shape desired, and may be adjustable. Additionally, nozzle 268 and outer support 266 may be of any desired cross section necessary to conveniently house components such as thermistor 284 and heating element 288.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An interchangeable unit adapted to couple to a computer numerical control ("CNC") machine to perform additive manufacturing in a workspace of the CNC machine, the unit comprising:
   a holder that couples to a spindle of the CNC machine;
   a microcontroller, wherein said microcontroller is configured to receive the rotational speed of the spindle as an input; and
   an extruder coupled to the holder and in communication with the microcontroller, wherein said extruder executes a first function in response to a first rotational speed range of the spindle and executes a second function in response to a second rotational speed range of the spindle.

2. The interchangeable unit according to claim 1, further comprising a filament source adapted to provide filament to the extruder.

3. The interchangeable unit according to claim 1, wherein the extruder includes one or more units selected from the group consisting of: additive manufacture units, material curing units, material heating units, and material cooling units.

4. The interchangeable unit according to claim 1, further including a generator, wherein rotation of the spindle causes the generator to produce power for the extruder.

5. The interchangeable unit according to claim 1, wherein the first function and second function are selected from the group consisting of: system reset, lower calibration, turn off heat, cool down, standby, reprogram settings, stay heated, change filament, change mix ratio of components, middle calibration, primary heating, secondary heating, change feed rate of components, upper calibration, cure material, heat material, cool material, and remove material.

6. The interchangeable unit according to claim 1, further comprising at least one anti rotate key, wherein the anti rotate key is configured to provide at least one operational element to the interchangeable unit from the spindle.

7. The interchangeable unit according to claim 1, further comprising a feeder unit, wherein said feeder unit comprises an interchangeable nozzle.

8. An extruder adapted to couple to a computer numerical control ("CNC") machine comprising:
   a holder that couples to a spindle of the CNC machine; and
   a generator supported by the holder that converts rotary motion of the spindle into power for the extruder, wherein the extruder provides extruded material to form a part in response to a speed of rotation of the spindle.

9. The extruder according to claim 8, further comprising a filament source adapted to provide filament to the extruder.

10. The extruder according to claim 8, further comprising a microcontroller coupled to the generator to convert the speed of rotation of the spindle into commands that control the operation of the extruder.

11. The extruder according to claim 8, further comprising a filament heater, wherein an operating state of the heater is controlled according to the speed of rotation of the spindle.

12. The extruder according to claim 8, further comprising a stepper motor, wherein an operating state of the stepper motor is controlled according to the speed of rotation of the spindle.

13. The extruder according to claim 8, further comprising at least one anti rotate key, wherein the anti rotate key is configured to provide at least one operational element to the extruder from the spindle.

14. The extruder unit according to claim 8, further comprising a feeder unit, wherein said feeder unit comprises an interchangeable nozzle.

15. A system for at least one of additive and subtractive manufacture of a part comprising:
 a computer numerical control ("CNC") machine, wherein said machine includes a spindle;
 an extruder, wherein the extruder provides extruded material to form a part in response to a speed of rotation of the spindle;
 a generator that converts rotary motion of the spindle into power for the extruder; and
 a filament source adapted to provide filament to the extruder for placement in a space to form the part.

16. The system according to claim 15, further comprising a filament heater, wherein an operating state of the heater is controlled according to the speed of rotation of the spindle.

17. The system according to claim 15, further comprising a stepper motor, wherein an operating state of the stepper motor is controlled according to the speed of rotation of the spindle.

18. The system according to claim 15, further comprising at least one anti rotate key, wherein the anti rotate key is configured to provide at least one operational element to the extruder from a spindle head of the CNC machine.

19. The system according to claim 15, further comprising a feeder unit, wherein said feeder unit comprises an interchangeable nozzle.

20. A method of additive and subtractive manufacture of a part comprising:
 providing a holder for coupling with a spindle of a computer numerical control ("CNC") machine, wherein said holder is further configured to alternatively couple with a material processing unit and a subtractive tool;
 depositing material within a space to form the part with the material processing unit in response to a speed of rotation of the spindle; and
 removing material from the part within the space with the subtractive tool.

21. The method according to claim 20, wherein the material processing unit further comprises one or more units selected from the group comprising: an extruder; a material curing unit; a material heating unit; a material cooling unit; a stepper motor; a microcontroller; a support bracket; an anti rotate key; and a direct current generator.

22. The method according to claim 20, further comprising controlling with a microcontroller the rotation speed of the spindle and an operating state of the material processing unit according to a program input.

23. The method according to claim 20, further comprising converting rotary motion of the spindle into power for the material processing unit.

24. An extruder adapted to couple to a computer numerical control ("CNC") machine comprising:
 a microprocessor that controls the operating state of the extruder according to a rotation speed of a spindle of the CNC machine, wherein the extruder provides extruded material to form a part in response to a speed of rotation of the spindle.

25. The extruder according to claim 24, further comprising a holder that couples the extruder to the spindle of the CNC machine and a generator supported by the holder that converts rotary motion of the spindle into power for the extruder.

26. The extruder according to claim 24, further comprising a filament heater, wherein an operating state of the heater is controlled according to the speed of rotation of the spindle.

27. The extruder according to claim 24, further comprising a stepper motor, wherein an operating state of the stepper motor is controlled according to the speed of rotation of the spindle.

28. The extruder according to claim 24, wherein at least one anti rotate key is configured to provide at least one operational element to the extruder from a spindle head of the CNC machine.

29. The extruder unit according to claim 24, further comprising a feeder unit, wherein said feeder unit comprises an interchangeable nozzle.

* * * * *